(12) United States Patent
Kim et al.

(10) Patent No.: US 12,459,886 B2
(45) Date of Patent: Nov. 4, 2025

(54) BRANCHED-CHAIN AMINO ACID CRYSTALLIZATION METHOD CAPABLE OF SUSTAINABLY CYCLING AMMONIA

(71) Applicant: CJ CHEILJEDANG CORPORATION, Seoul (KR)

(72) Inventors: Jun Woo Kim, Seoul (KR); Shin Ae Park, Seoul (KR); Ji Hyun Shin, Seoul (KR); Jae Hun Yu, Seoul (KR); Chang Yub Oh, Seoul (KR); Min Jong Kim, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 774 days.

(21) Appl. No.: 17/768,272

(22) PCT Filed: Nov. 9, 2020

(86) PCT No.: PCT/KR2020/015633
§ 371 (c)(1),
(2) Date: Apr. 12, 2022

(87) PCT Pub. No.: WO2021/107451
PCT Pub. Date: Jun. 3, 2021

(65) Prior Publication Data
US 2024/0132442 A1  Apr. 25, 2024
US 2024/0228430 A9  Jul. 11, 2024

(30) Foreign Application Priority Data

Nov. 25, 2019 (KR) .......... 10-2019-0152229

(51) Int. Cl.
*C07C 229/08* (2006.01)

(52) U.S. Cl.
CPC ........ *C07C 229/08* (2013.01); *C07B 2200/13* (2013.01)

(58) Field of Classification Search
USPC .......................................... 562/553
See application file for complete search history.

(56) References Cited

U.S. PATENT DOCUMENTS 3,875,221 A * 4/1975 Mihara ................ C07C 255/00
562/554
5,118,815 A    6/1992 Shiroshita et al.

FOREIGN PATENT DOCUMENTS

| CN | 1337394 A    | 2/2002  |
| CN | 1386734 A    | 12/2002 |
| CN | 105294468 A  | 2/2016  |
| CN | 106748848 A  | 5/2017  |
| CN | 108707083 A  | 10/2018 |
| CN | 109430535 A  | 3/2019  |
| JP | 1985237054 A | 11/1985 |
| KR | 101736654 B1 | 5/2017  |

OTHER PUBLICATIONS

Machine translation of CN 1386734, Dec. 2002.*
Machine translation of CN105294468 Dec. 2016.*
English Abstract of CN 105294468.
English Abstract of CN 106748848.
English Abstract of CN 109430535.
English Abstract of JP 1985-237054.
English Abstract of KR 10-1736654.
English Translation of International Search Report dated Apr. 15, 2021, issued in PCT/KR2020/015633, 2 pp.
Chinese Office Action for Chinese Patent Application No. 202080073444.1 dated Mar. 24, 2023.

* cited by examiner

*Primary Examiner* — Ana Z Muresan
(74) *Attorney, Agent, or Firm* — CANTOR COLBURN LLP

(57) ABSTRACT

The present disclosure relates to a crystallization method of branched-chain amino acids capable of sustainably cycling ammonia, and branched-chain amino acid crystal produced by the method.

10 Claims, 1 Drawing Sheet

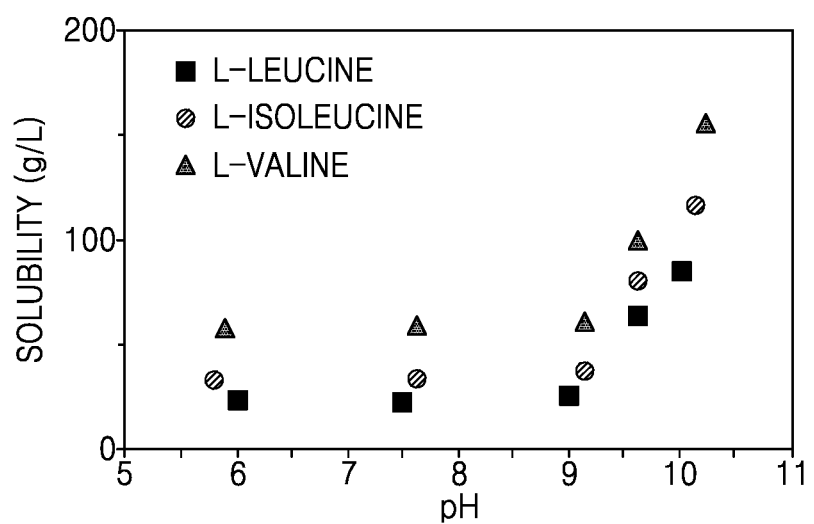

BRANCHED-CHAIN AMINO ACID CRYSTALLIZATION METHOD CAPABLE OF SUSTAINABLY CYCLING AMMONIA

This application is a national stage application of PCT/KR2020/015633, filed Nov. 9, 2020, which claims priority to Korean Patent Application No. 10-2019-0152229 filed on Nov. 25, 2019, which is hereby incorporated by reference in its entirety.

TECHNICAL FIELD

The present disclosure relates to a crystallization method of branched-chain amino acids capable of sustainably cycling ammonia.

BACKGROUND ART

A branched-chain amino acid (BCAA) is an amino acid having a branched aliphatic side-chain, and among the 20 proteinogenic amino acids, leucine, isoleucine, and valine are branched-chain amino acids. As a protein source, branched-chain amino acids play a very important role in building muscle, so they are treated as essential substances for people who mainly do anaerobic exercises. In fact, branched-chain amino acids are among the most popular health supplements next to protein supplements, along with glutamine and creatine.

Meanwhile, branched-chain amino acids have a lower solubility in pure water compared to other hydrophilic amino acids due to the hydrophobic aliphatic side chain. In particular, an increase in the concentration of the target material in the fermentation broth due to the development of a new fermentation technology is considered inevitable. That is, in the industrial fermentation process, when the branched-chain amino acids in the fermentation broth has a higher concentration than the solubility thereof, amino acid crystals will be formed in the fermentation broth, which in turn acts as a factor to inhibit pretreatment of the fermentation broth, or reduce recovery rate of branched-chain amino acid crystals. Therefore, in order to solve this problem, there is a need for a new technology capable of enhancing the solubility of branched-chain amino acids in fermentation broth or suspension.

In addition, neutralization recrystallization method used to crystallize branched-chain amino acids requires a large amount of pH control material, and thus crystallization efficiency is low and salt waste is generated that is difficult to cycle sustainably, and thereby environmental problems are caused. Therefore, there is a need to develop a new crystallization process that is both highly efficient and environmentally friendly.

PRIOR ART LITERATURE

Patent Literature (Patent Document 1) Republic of Korea Patent No. 10-1736654

DESCRIPTION OF EMBODIMENTS

Technical Problem

An object of the present disclosure is to provide a crystallization method of branched-chain amino acids capable of sustainably cycling ammonia.

Another object of the present disclosure is to provide a branched-chain amino acid crystal produced by the above method.

Solution to Problem

Each description and embodiment disclosed in the application may also be applied to other descriptions and embodiments. That is, all combinations of the various elements disclosed in the application fall within the scope of the application. In addition, it should not be construed that the scope of the present application is limited by the detailed description described below.

An aspect of the present disclosure provides a crystallization method of branched-chain amino acids including: (a) mixing the reaction solution containing the branched-chain amino acid crystals with ammonia to obtain a solution in which the branched-chain amino acid crystals are dissolved; (b) crystallizing the obtained solution to obtain a concentrate containing branched-chain amino acid crystals; (c) obtaining a mixed gas including water vapor and ammonia, generated in the crystallization process; and (d) reusing the ammonia derived from the obtained mixed gas as the ammonia of the process (a), wherein the process (b) and process (c) are carried out simultaneously or sequentially.

Each process of the crystallization method of branched-chain amino acids of the present application will be described in detail as follows.

First, the method of the present application may include mixing a reaction solution containing branched-chain amino acid crystals with ammonia to obtain a solution in which branched-chain amino acid crystals are dissolved.

As used herein, the term "branched-chain amino acid" refers to an amino acid having a branched aliphatic side chain, and may be at least one amino acid selected from leucine, isoleucine, and valine, for example, at least one amino acid selected from L-leucine, L-isoleucine, and L-valine.

In the above operation, mixing with ammonia may result in an increase in the pH of the reaction solution containing the branched-chain amino acid crystals and an increase in the solubility of the branched-chain amino acid in the reaction solution. For the ammonia, in the first process, separate ammonia, for example, ammonia water, may be mixed with the reaction solution to generate a crystallization feed, and in subsequent processes, ammonia obtained from the mixed gas of process (c) may be used for mixing.

In an embodiment, the reaction solution containing the branched-chain amino acid crystals may be in the form of suspension in which the branched-chain amino acids are supersaturated, for example, the reaction solution may include a solution or fermentation broth containing branched-chain amino acid crystals.

The solution containing the branched-chain amino acid crystals may be a mixed solution of branched-chain amino acid crystals and distilled water, and the fermentation broth containing branched-chain amino acid crystals may be obtained by culturing microorganisms producing branched-chain amino acids in a medium.

The microorganism producing the branched-chain amino acids is not particularly limited within the range that the microorganism has an ability to produce branched-chain amino acids, and is, for example, of the genus *Corynebacterium* or *Escherichia*, and may be specifically, a *Corynebacterium glutamicum* strain or a mutant thereof, and in an embodiment, the microorganism may be a *Coryne-*

*bacterium glutamicum* mutant having an accession number of KCCM11662P, KCCM11248P or KCCM11336P.

As used herein, the term "culturing" means growing microorganisms in an appropriate artificially controlled environment. In the present application, the method of producing branched-chain amino acids using microorganisms having an ability to produce branched-chain amino acids may be performed using a method widely known in the art. Specifically, the culturing may be carried out continuously in a batch process, a fed batch or repeated fed batch process, but is not limited thereto.

The medium used for culturing should meet the requirements of the particular strain in an appropriate way. For example, culture media for strains of *Corynebacterium* genus are well known in the art (for example, Manual of Methods for General Bacteriology. American Society for Bacteriology. Washington D.C., USA, 1981). Sugar sources that may be used include sugars and carbohydrates such as glucose, saccharose, lactose, fructose, maltose, starch, cellulose, oils and fats such as soybean oil, sunflower oil, castor oil, coconut oil, fatty acids such as palmitic acid, stearic acid and linoleic acid, alcohols such as glycerol and ethanol, and organic acids such as acetic acid. These materials may be used individually or as a mixture, but are not limited thereto. Nitrogen sources that may be used include peptone, yeast extract, meat juice, malt extract, corn steep liquor, soybean wheat and urea or inorganic compounds such as ammonium sulfate, ammonium chloride, ammonium phosphate, ammonium carbonate and ammonium nitrate. The nitrogen source may also be used individually or as a mixture, but is not limited thereto. Phosphorus sources that may be used may include potassium dihydrogen phosphate or dipotassium hydrogen phosphate or a corresponding sodium-containing salt.

In addition, the culture medium may contain a metal salt such as magnesium sulfate or iron sulfate which is necessary for growth. Additionally, essential growth substances such as amino acids and vitamins may be used. In addition, precursors suitable for the culture medium may be used. The above-mentioned raw materials may be added batchwise or continuously by a method suitable for the culture during the culturing process. However, embodiments of the present disclosure are not limited thereto.

In an embodiment, the pH of the solution in which the branched-chain amino acid crystal obtained in process (a) is dissolved may be 9 to 12. When the pH of the solution is 9 or less, branched-chain amino acid crystals are present in the solution, and may reduce the crystallization efficiency of the solution. The pH of the branched-chain amino acid solution may be in the range of, for example, 9 to 11.5, 9 to 11, 9 to 10.5, 9 to 10.0, 9 to 9.5, 9.5 to 12.0, 9.5 to 11.5, 9.5 to 11.0, or 9.5 to 10.5, 9.5 to 10, 10 to 12.0, 10 to 11.5, 10 to 11.0, or 10 to 10.5, however, the pH may be appropriately adjusted according to the type of amino acid, other reaction conditions, etc.

In an embodiment, the solution in which the branched-chain amino acid crystals are dissolved may have been changed from suspension to a transparent solution as the branched-chain amino acid crystals were dissolved.

Thereafter, the method of the present application may include crystallizing a solution in which the obtained branched-chain amino acid crystals are dissolved to obtain a concentrate containing the branched-chain amino acid crystals.

In the operation, a technique known in the art may be applied to crystallization of the branched-chain amino acid solution. For example, the crystallization may be accompanied by evaporation of the solvent, and the temperature during the crystallization process may be 60° C. to 90° C., 60° C. to 85° C., 60° C. to 80° C., 60° C. to 75° C., 60° C. to 70° C., 60° C. to 65° C., 70° C. to 90° C., 70° C. to 85° C., 70° C. to 80° C., 70° C. to 75° C., 75° C. to 90° C., 75° C. to 85° C., or 75° C. to 80° C. In addition, the crystallization may be performed by a crystallization device of which configuration and structure are not limited, as long as the object of the present application may be achieved.

The concentrate contains a high concentration of branched-chain amino acids, and the concentration of the branched-chain amino acids may be, for example, 40 g/L to 800 g/L, 55 g/L to 750 g/L, 70 g/L to 700 g/L, 85 g/L to 650 g/L, 100 g/L to 600 g/L, 115 g/L to 550 g/L, 130 g/L to 500 g/L, 145 g/L to 450 g/L, 160 g/L to 400 g/L, 175 g/L to 350 g/L, or 190 g/L to 300 g/L, but may be appropriately modified according to the scale of the industrialized process.

In an embodiment, a concentration of the branched-chain amino acids in the concentrate may be, with respect to the concentration of the branched-chain amino acids in the reaction solution containing branched-chain amino acids of process (a), 1.0 times to 2.0 times, 1.0 times to 1.8 times, 1.0 times to 1.7 times, 1.0 times to 1.6 times, 1.2 times to 2.0 times, 1.2 times to 1.8 times, 1.2 times to 1.7 times, 1.2 times to 1.6 times, 1.3 times to 2.0 times, 1.3 times to 1.8 times, 1.3 times to 1.7 times, 1.3 times to 1.6 times, 1.4 times to 2.0 times, 1.4 times to 1.8 times, 1.4 times to 1.7 times, or 1.4 times to 1.6 times, but is not limited thereto.

In an embodiment, the concentrate may have been changed to a form of suspension due to an increased turbidity of the solution as branched-chain amino acid crystals are formed again by crystallization of a transparent solution of branched-chain amino acids.

The method of the present application may include obtaining a mixed gas including water vapor and ammonia generated in the crystallization process.

In an embodiment, the process may be carried out simultaneously or sequentially with the aforementioned process of obtaining a concentrate containing branched-chain amino acid crystals, and for example, may be carried out by using an ammonia recovery device of which configuration and structure are not limited as long as the device can perform the step.

In an embodiment, the process may be carried out until the pH of the solution in which the branched-chain amino acid crystal of process (b) is dissolved becomes 5.5 to 8.0, specifically, until the pH of the solution reaches 5.5 to 7.5, 5.5 to 7.0, 5.5 to 6.5, 6.0 to 8.0, 6.0 to 7.5, 6.0 to 7.0, 6.0 to 6.5, 6.5 to 8.0, 6.5 to 7.5, 6.5 to 7.0, or 7.0.

In addition, the mixed gas may be a gas in a vapor state in which water vapor and ammonia are mixed, and since the composition ratio of the mixed gas is dominantly influenced by gas-liquid equilibrium of water-ammonia-branched-chain ammonia, the composition may have a varied distribution according to the internal temperature and pressure conditions.

The method of the present application may include reusing the ammonia derived from the obtained mixed gas as ammonia of process (a).

In an embodiment, the process may be reusing the ammonia in a vapor state, or in a liquid state wherein the vapor is compressed or condensed.

Prior to the above operation, a process of condensing or compressing the obtained mixed gas may be further included to convert ammonia in the mixed gas to a liquid state, for example, condensing the mixed gas by using a cooler, compressing the mixed gas by using a compressor, or using the cooler and compressor at the same time. In addition, for example, if the above process may be performed, it may be performed by a compressor without limitation in its configuration and structure.

In an embodiment, the above process may be repeated until a high concentration of branched-chain amino acid concentrate may be obtained. For example, the process may be repeated 2 to 50 times, 2 to 45 times, 2 to 40 times, 2 to 35 times, 2 to 30 times, 2 to 25 times, 2 to 20 times, 2 to 15 times, 2 to 10 times, or 2 to 5 times, but is not limited thereto.

The method of the present application includes reusing ammonia derived from the mixed gas obtained in process (c) as the ammonia of process (a), so that the method does not require a large amount of pH adjusting material and thus is economical, improves the crystallization efficiency of branched-chain amino acids and reduces generation of salt waste that is difficult to sustainably cycle, thereby the method may be used in an environmentally friendly way.

In addition, the method of the present application may further include, between process (a) and process (b), microfiltering the solution in which the branched-chain amino acid crystals are dissolved, to remove the biomass in the solution.

In addition, the method of the present application may further include, between process (a) and process (b), adding activated carbon to the solution in which the branched-chain amino acid crystals are dissolved to remove the colored substances in the solution.

According to an embodiment, ammonia generated in a plurality of crystallization processes could be obtained with a high level of recovery rate, and the recovered ammonia, for example, ammonia water, could be reused to dissolve the branched-chain amino acid crystals present in the reaction solution. Accordingly, the method may continuously produce branched-chain amino acid crystals based on the crystallization process without a separate pH adjusting agent, and thus can improve production efficiency of branched-chain amino acid crystals.

The method of the present application may further include, after process (b), separating the branched-chain amino acid crystals from the concentrate containing the branched-chain amino acid crystals of process (b).

Separating the branched-chain amino acid crystal may be performed, for example, between process (b) and process (c), between process (c) and process (d), after process (d), or simultaneously with process (c) or process (d), but when the separation is performed after process (b), it may be performed at any process regardless of the order of process (c) and process (d).

In the above operation, the separation of the branched-chain amino acid crystals from the concentrate includes, for example, obtaining wet crystal of branched-chain amino acids by solid-liquid separation of the concentrate containing the branched-chain amino acid crystals; and drying the obtained wet crystal to obtain branched-chain amino acid crystals, but conventional techniques known in the art related to isolation and purification of amino acid crystals may be applied without limitation.

Another aspect of the present disclosure provides a branched-chain amino acid crystal produced by the crystallization method of branched-chain amino acids including: (a) mixing the reaction solution containing the branched-chain amino acid crystals with ammonia to obtain a solution in which the branched-chain amino acid crystals are dissolved; (b) crystallizing the obtained solution to obtain a concentrate containing branched-chain amino acid crystals; (c) obtaining a mixed gas including water vapor and ammonia, generated in the crystallization process; and (d) reusing the ammonia derived from the obtained mixed gas as the ammonia of the process (a), wherein the process (b) and process (c) are carried out simultaneously or sequentially.

The crystallization method of the branched-chain amino acid is as described above.

Advantageous Effects of Disclosure

The crystallization method of branched-chain amino acids according to the present application obtains ammonia in a vapor state during the crystallization process, which was first added to increase solubility of branched-chain amino acids, and reuses it, thereby improving production efficiency of branched-chain amino acid crystals and reducing production costs because a large amount of pH adjusting material and additional neutralization process are not required.

In addition, the crystallization method of branched-chain amino acids according to the present application may be used as an environmentally friendly method by reducing the generation of salt wastes that are difficult to cycle sustainably.

BRIEF DESCRIPTION OF DRAWING

FIG. 1 shows results of identifying change of solubility of branched-chain amino acids according to the pH of the solution.

MODE OF DISCLOSURE

Hereinafter, the present disclosure will be described in more detail through examples. However, these examples are intended to illustrate the present disclosure, and the scope of the present disclosure is not limited to these examples. In addition, since the content not described in this specification may be sufficiently recognized and inferred by those skilled in the related art or a similar art thereto, the description thereof will be omitted.

Example 1. Experimental Materials and Methods (1) Experimental Material

As branched-chain amino acids, L-valine, L-isoleucine, and L-leucine products with a purity of 98% or more were used, and the branched-chain amino acids were all manufactured by C J Cheiljedang. As water, tertiary distilled water prepared by ourselves was used, and 26% (v/v) ammonia water and 98% (v/v) sulfuric acid were purchased from Daejung Chemicals & Metals and used. 0.1 M nitric acid aqueous solution and 0.02 M dipicolinic acid aqueous solution for high-performance liquid chromatography (HPLC) analysis were purchased from Sigma-Aldrich (US) and used.

(2) Analysis of the Concentration of the Branched-Chain Amino Acid Solution and the Purity of the Branched-Chain Amino Acid Crystal The concentration of the branched-chain amino acid solution and the purity of the branched-chain amino acid crystals were analyzed by using high-performance liquid chromatography (model DIONEX Ultimate 3000 system, Thermo Scientific, US), and the analysis conditions were as follows:

Column: Hypersil gold HPLC column (Thermo Scientific, US)
Column temperature: 40° C.
Mobile phase: 0.1 wt % sulfuric acid aqueous solution
Mobile phase speed: 1.0 ml/min
Detector: Fluorescence detector (3) Analysis of Ammonia Concentration in the Branched-Chain Amino Acid Solution The analysis of ammonia concentration in the branched-chain amino acid solution was performed by using ion chromatography (model 930 compact IC Flex, Metrohm, Switzerland), and the analysis conditions were as follows:
Column: Metrosep C4-150 (Metrohm, Switzerland)
Column temperature: 25° C.
Mobile phase: 0.7 mM nitric acid aqueous solution+1.7 mM dipicolinic acid aqueous solution
Mobile phase speed: 1.0 m l/m in.

(4) Solubility Analysis of Branched-Chain Amino Acids

Solubility of branched-chain amino acids was measured in a 1 L jacketed reactor made of glass. After mixing distilled water and ammonia water in various ratios in a 1 L jacketed reactor, an excess amount of branched-chain amino acid crystals was added and stirred, thereby preparing a reaction solution containing branched-chain amino acid crystals. Thereafter, while the internal temperature of the reactor was kept constant at 30° C. by using a freeze/heat circulation device (model F35, Julabo, Germany), this condition was maintained for at least 12 hours with stirring. After that, when the stirring was stopped and the branched-chain amino acid crystals were all settled, a portion of the supernatant in a clear state was transferred to a syringe sampler equipped with a 0.45 μm syringe filter. At this time, the pH of the solution was measured by using a pH meter (model S220, Mettler Toledo, US). The concentration of the sample was measured by using HPLC after dilution with tertiary distilled water using a quantitative flask. The concentration of the supernatant sample was assumed to be equal to the solubility, and the change in solubility of branched-chain amino acids according to the pH of the solution was identified (FIG. 1). As a result, it was confirmed that the solubility of the branched-chain amino acid was increased from the time point when the pH of the solution becomes 9 or higher.

Example 2. Isolation and Purification in Solution Containing Branched-Chain Amino Acid Crystals (1) Crystallization of Branched-Chain Amino Acids and Recovery of Ammonia Crystallization was performed a total of 5 times under the same process conditions for each condition. However, in the first crystallization process, in order to prepare a crystallization feed, ammonia water was added to a solution containing BCAA crystals prepared by mixing BCAA crystals and distilled water to dissolve the entire BCAA crystals. In subsequent rounds, the recovered ammonia water was added to the reaction solution containing BCAA crystals to dissolve BCAA crystals (experimental group). On the other hand, as a control group, a group was used, in which 26% (v/v) ammonia water was added to a reaction solution containing BCAA crystals without a recovery process of ammonia water, and then the pH was readjusted to be 7 with 98% (v/v) sulfuric acid.

Crystallization and recovery of ammonia was performed by a device of a structure including: a crystallizer including an injection unit into which the crystallization feed is injected, a pH control unit, a heating circulator and an outlet; a vapor recovery device including an injection unit into which the recovered ammonia water is injected, a cooling circulator and an outlet; and a compressor between the vapor recovery device and the crystallizer. Specifically, the crystallization feed refers to a concentrate containing branched-chain amino acid crystals obtained in the first crystallization process, and the crystallization was carried out in a glass 20 L jacketed reactor, and to prevent scaling in the heat exchange unit, the jacket was installed only up to the height of the point where the volume of the internal liquid was 10 L. The jacket area was filled with tertiary distilled water of which temperature was controlled by a freeze/heat circulation device (model F35, Julabo, Germany), and the temperature was maintained at 80° C. during the crystallization process. Agitation of the internal reaction solution was carried out by using a stirrer (model RW-20, IKA, Germany) capable of controlling the rotation speed with a 4-blade impeller made of Teflon, and the stirring speed was maintained at 200 rpm while crystallization was in progress. The pressure reduction inside the reactor was carried out by using a compressor connected to a pipe, and an electronic vacuum controller (model NVC 2300-A, Eyela, Japan) was installed between the compressor and the crystallizer to control the pressure. The pressure inside the crystallizer was maintained at 100 mbar. The ammonia recovery unit consisted of a 20 L jacketed pressure vessel made of stainless steel that can store up to 20 bar, and cooling was carried out with cooling water of 4° C. supplied by its own facility. At this time, the recovery of ammonia was carried out until the pH inside the crystallizer became 5.5 to 8.0. The concentration of the final concentrate was adjusted to be 1.5 times the concentration of the reaction solution containing BCAA crystals before ammonia was added.

(2) Isolation and Drying of Branched-Chain Amino Acid Crystals

When the final concentration was reached, the crystallization process was terminated and the concentrate in the reactor was recovered through a discharge pipe arranged below. Thereafter, the recovered concentrate was subjected to solid-liquid separation for 5 min at a speed of 2,000 rpm using a centrifugal basket separator (Model H-122, Kokusan, Japan) equipped with a cotton filter. As needed, a washing process was performed at the beginning of the separation using distilled water. Thereafter, the obtained wet crystal was dried in an oven dryer at 80° C., until there was no change in weight to obtain BCAA crystals.

(3) Experimental Results (3.1) L-leucine Crystallization and Ammonia Recovery

Crystallization of L-leucine and ammonia recovery experiments were carried out using a 20 L suspension prepared from L-leucine crystals with a purity of 98% or more. The experiment was conducted a total of 5 times, and among the experimental results, the average values of the 2nd to the 5th crystallization processes are shown in Table 1. For the reaction solution having L-leucine concentration in a range of 30 g/L to 200 g/L, the pH of the reaction solution was adjusted to be the range of 9 to 12 by adding the recovered ammonia water to dissolve the crystals, and then ammonia water was again recovered while proceeding crystallization.

As shown in Table 1 below, there was no recovered ammonia water in the control group, but in the crystallization process according to an example, ammonia water having a concentration of 9% to 23% could be secured with a recovery rate of 97% or more, and the recovered ammonia water could be reused to dissolve L-leucine crystals in the reaction solution.

TABLE 1

| Item | Control group | | | Experimental group | | |
|---|---|---|---|---|---|---|
| Initial concentration (g/L) of reaction solution | 30 | 100 | 200 | 30 | 100 | 200 |
| Initial pH of reaction solution | 6 | 6 | 6 | 6 | 6 | 6 |
| Input ratio (vol %) of recovered ammonia | 0 | 0 | 0 | 4 | 8 | 13 |
| Input ratio (vol %) of 26% ammonia | 1 | 5 | 10 | 0 | 0 | 0 |
| Input ratio (vol %) of 98% sulfuric acid | 1 | 2 | 4 | 1 | 2 | 4 |
| Concentration (g/L) of the concentrate obtained in the first crystallization process | 29 | 93 | 175 | 28 | 91 | 167 |
| pH of the concentrate obtained in the first crystallization process | 7 | 7 | 7 | 9 | 11 | 12 |
| Concentration (g/L) of final concentrate | 45 | 150 | 300 | 45 | 150 | 300 |
| pH of final concentrate | 7 | 7 | 7 | 7 | 7 | 7 |
| Recovery rate (%) of crystal | 42 | 81 | 90 | 42 | 81 | 90 |
| Recovery rate (%) of ammonia | 0 | 0 | 0 | 97 | 98 | 98 |
| Concentration (%) of recovered ammonia | 0 | 0 | 0 | 9 | 17 | 23 |

(3.2) L-Isoleucine Crystallization and Ammonia Recovery

Crystallization of L-isoleucine and ammonia recovery experiments were carried out by using a 20 L suspension prepared from L-isoleucine crystals with a purity of 98% or more. The experiment was conducted a total of 5 times, and among the experimental results, the average values of the 2nd to the 5th crystallization processes are shown in Table 2. For the reaction solution having the L-isoleucine concentration in a range of 50 g/L to 250 g/L, the pH of the reaction solution was adjusted to be the range of 9 to 12 by adding the recovered ammonia water to dissolve the crystals, and then ammonia water was recovered again in the following crystallization.

As shown in Table 2 below, there was no recovered ammonia water in the control group, but in the crystallization process according to an example, ammonia water having a concentration of 9% to 22% could be secured with a recovery rate of 97% or more, and the recovered ammonia water could be reused to dissolve L-isoleucine crystals in the reaction solution.

TABLE 2

| Item | Control group | | | Experimental group | | |
|---|---|---|---|---|---|---|
| Initial concentration (g/L) of reaction solution | 50 | 150 | 250 | 50 | 150 | 250 |
| Initial pH of reaction solution | 6 | 6 | 6 | 6 | 6 | 6 |
| Input ratio (vol %) of recovered ammonia | 0 | 0 | 0 | 6 | 11 | 17 |
| Input ratio (vol %) of 26% ammonia | 2 | 7 | 12 | 0 | 0 | 0 |
| Input ratio (vol %) of 98% sulfuric acid | 1 | 3 | 5 | 1 | 3 | 5 |
| Concentration (g/L) of the concentrate obtained in the first crystallization process | 48 | 136 | 213 | 45 | 131 | 205 |
| pH of the concentrate obtained in the first crystallization process | 7 | 7 | 7 | 9 | 11 | 12 |
| Concentration (g/L) of final concentrate | 75 | 225 | 375 | 75 | 225 | 375 |
| pH of final concentrate | 7 | 7 | 7 | 7 | 7 | 7 |
| Recovery rate (%) of crystal | 45 | 80 | 88 | 45 | 80 | 88 |
| Recovery rate (%) of ammonia | 0 | 0 | 0 | 97 | 98 | 98 |
| Concentration (%) of recovered ammonia | 0 | 0 | 0 | 9 | 17 | 22 |

(3.3) Crystallization of L-Valine and Recovery of Ammonia

Crystallization of L-valine and ammonia recovery experiments were carried out by using a 20 L suspension prepared from L-valine crystals with a purity of 98% or more. The experiment was conducted a total of 5 times, and among the experimental results, the average values of the 2nd to the 5th crystallization processes are shown in Table 3. For a reaction solution having L-valine concentration in a range of 120 g/L to 350 g/L, the pH of the reaction solution was adjusted to be a range of 9 to 12 by adding the recovered ammonia water to dissolve the crystals, and then ammonia water was again recovered while proceeding crystallization.

As shown in Table 3 below, there was no recovered ammonia water in the control group, but in the crystallization process according to an example, ammonia water having a concentration of 13% to 23% could be obtained with a recovery rate of 98% or more, and the recovered ammonia water could be reused to dissolve L-valine crystals.

TABLE 3

| Item | Control group | | | Experimental group | | |
|---|---|---|---|---|---|---|
| Initial concentration (g/L) of reaction solution | 120 | 250 | 350 | 120 | 250 | 350 |
| Initial pH of reaction solution | 6 | 6 | 6 | 6 | 6 | 6 |
| Input ratio (vol %) of recovered ammonia | 0 | 0 | 0 | 11 | 21 | 30 |
| Input ratio (vol %) of 26% ammonia | 7 | 14 | 20 | 0 | 0 | 0 |
| Input ratio (vol %) of 98% sulfuric acid | 3 | 6 | 8 | 1 | 3 | 5 |
| Concentration (g/L) of the concentrate obtained in the first crystallization process | 110 | 209 | 275 | 107 | 206 | 273 |
| pH of the concentrate obtained in the first crystallization process | 7 | 7 | 7 | 9 | 11 | 12 |
| Concentration (g/L) of final concentrate | 180 | 375 | 525 | 180 | 375 | 525 |
| pH of final concentrate | 7 | 7 | 7 | 7 | 7 | 7 |
| Recovery rate (%) of crystal | 76 | 87 | 90 | 76 | 87 | 90 |
| Recovery rate (%) of ammonia | 0 | 0 | 0 | 98 | 98 | 98 |
| Concentration (%) of recovered ammonia | 0 | 0 | 0 | 13 | 17 | 23 |

Example 3. Isolation and Purification in Fermentation Broth Containing Branched-Chain Amino Acid Crystals (1) Preparation of Fermentation Broth Containing Branched-Chain Amino Acids A mutant strain of *Corynebacterium glutamicum* (accession number: KCCM11662P) that produces L-leucine, a mutant strain of *Corynebacterium glutamicum* (accession number: KCCM11248P) that produces L-isoleucine, and a mutant strain of *Corynebacterium glutamicum* (Accession No.: KCCM11336P) that produces L-valine, were used to prepare fermentation broths containing each of L-leucine, L-isoleucine and L-valine.

Specifically, 40 mL of pre-culture medium was dispensed into a 500 mL Erlenmeyer flask for shaking, autoclaved at 121° C. for 15 minutes, and each strain was inoculated and cultured while being stirred at 200 rpm for 24 hours in a rotary stirrer at 33° C. Thereafter, a 5 L fermenter was filled with 3 L of the seed culture medium and autoclaved at 121° C. for 30 minutes, the pH was adjusted to be 7.0, and 4% of the pre-culture medium was inoculated and cultured at 33° C. under the condition of 800 rpm and an aeration volume of 0.5 vvm, until optical density (OD) value became 20, to perform a seed culture. Afterwards, a 5 L fermenter was filled with 2.1 L of the main culture medium and autoclaved at 121° C. for 30 minutes, then 0.6 L of glucose was added, and pH was adjusted to be 7.0 by using ammonia gas. The seed culture medium was inoculated to the prepared main culture tank so that its percentage would be 20% and cultured for 42 hours under the conditions of a culturing temperature of 33° C. and an aeration volume of 1.0 vvm, controlling the stirring speed to be 400 rpm to 800 rpm so that the dissolved oxygen is maintained at 30% in the least or more and thus, a fermentation broth containing each of L-leucine, L-isoleucine and L-valine was prepared. The compositions of the pre-culture, seed culture and main culture medium used in the culturing process are shown in Table 4 below.

TABLE 4

| Composition | Pre-culture medium | Seed culture medium | Main culture medium |
| --- | --- | --- | --- |
| Glucose (g/l) | 5.0 | 10.1 | 40.2 |
| $MgSO_4$ (g/l) | 0.5 | 0.5 | 4.2 |
| Yeast Extract (g/l) | 5 | 10 | 3.2 |
| $KH_2PO_4$ | 2 | 3 | 3 |
| Ammonium Sulfate (g/l) | | | 6.3 |
| $NH_4Cl$ (g/l) | 0.5 | 1 | |
| NaCl (g/l) | 0.5 | 0.5 | |
| $Na_2HPO_4$ (g/l) | 4.07 | 5.07 | |

(2) Isolation and Drying of Branched-Chain Amino Acid Crystals

Addition of ammonia, crystallization, isolation and drying of BCAA crystals were performed in the same manner as described in (1) and (2) of Example 2 by using the fermentation broth containing BCAA crystals prepared as described above instead of the solution containing BCAA crystals, with this, microfiltering and adding activated carbon powder were further performed as follows between the adding ammonia and the crystallizing.

Specifically, biomass such as microorganisms was removed from the solution in which BCAA crystals were dissolved by using a microfiltration device equipped with a 0.1 μm microfiltration membrane (model Pellicon 2, Merck, US), and for removal of colored substances, after adding 10 wt %, with respect to the weight of BCAA, of activated carbon powder (model YL303, Yuanli, China) to the permeate, the mixture was stirred at 60° C. for 30 minutes. Thereafter, activated carbon was removed from the BCAA solution through primary vacuum filtration using a 7 μm filtration membrane, and residual activated carbon was further removed through secondary vacuum filtration using a 0.45 μm filtration membrane.

(3) Experimental Results (3.1) Purification of L-leucine

L-leucine purification was repeated 5 times on the fermentation broth having an L-leucine concentration of 60 g/L containing L-leucine crystals prepared in (1) of Example 3. The pH was adjusted to be 10 by adding the recovered ammonia water (at first, ammonia water reagent) to 20 L of fermentation broth containing L-leucine crystals, and after dissolving the entire amount of L-leucine, biomass was removed through microfiltration. Thereafter, the microfiltration permeate was treated with activated carbon powder to separate colored substances. Afterwards, concentrated crystallization of the filtrate was carried out to a concentration of 90 g/L, and the concentrate containing L-leucine crystals was subjected to solid-liquid separation by using a basket filter. At this time, washing was performed by using tertiary distilled water of 20 vol %, with respect to the concentrate containing L-leucine crystals.

The final weight of the recovered crystals after drying was 1.1 kg on average of 5 times, and the purity of the crystals was 98.4% on average of 5 times. In the crystallization process according to an example, it was possible to secure ammonia water of a concentration of 13% at a recovery rate of 98% or more, and the recovered ammonia water could be reused to dissolve L-leucine crystals in the fermentation broth.

(3.2) Purification of L-isoleucine

Purification of L-isoleucine was repeated 5 times from the fermentation broth having an L-isoleucine concentration of 90 g/L containing L-isoleucine crystals prepared in (1) of Example 3. The recovered ammonia water (at first, ammonia water reagent) was added to 20 L of fermentation broth containing L-isoleucine crystals to adjust pH to 10, the entire amount of L-isoleucine was dissolved, and the biomass was removed through microfiltration. Thereafter, the microfiltration permeate was treated with activated carbon powder to separate colored substances. Thereafter, concentrated crystallization of the filtrate was carried out to a concentration of 135 g/L, and the concentrate containing L-isoleucine crystals was subjected to solid-liquid separation using a basket filter. At this time, washing was performed by using tertiary distilled water of 20 vol %, with respect to the concentrate containing L-isoleucine crystals.

The final weight of the recovered crystals after drying was 1.7 kg on average of 5 times, and purity of the crystals was 98.6% on average of 5 times. In the crystallization process according to an example, it was possible to secure ammonia water of a concentration of 13% at a recovery rate of 98% or more, and the recovered ammonia water could be reused to dissolve L-isoleucine crystals in the fermentation broth.

(3.3) Purification of L-valine

L-valine purification was repeated 5 times on the fermentation broth having an L-valine concentration of 150 g/L containing L-valine crystals prepared in (1) of Example 3. The pH was adjusted to be 10 by adding the recovered ammonia water (at first, ammonia water reagent) to 20 L of fermentation broth containing L-valine crystals, and after dissolving the entire amount of L-valine, biomass was removed through microfiltration. Thereafter, the microfiltration permeate was treated with activated carbon powder to separate colored substances. Afterwards, concentrated crystallization of the filtrate was carried out to a concentration of 225 g/L, and the concentrate containing L-valine crystals was subjected to solid-liquid separation by using a basket filter. At this time, washing was performed by using tertiary distilled water of 20 vol %, with respect to the concentrate containing L-valine crystals.

The final weight of the recovered crystals after drying was 3.0 kg on average of 5 times, and purity of the crystals was 98.4% on average of 5 times. In the crystallization process according to an example, it was possible to secure ammonia water of a concentration of 13% at a recovery rate of 98% or more, and the recovered ammonia water could be reused to dissolve L-valine crystals in the fermentation broth.

The above description of the present disclosure is for illustrative purposes, and those skilled in the art to which the present disclosure belongs will be able to understand that the examples and embodiments can be easily modified without changing the technical idea or essential features of the disclosure. Therefore, it should be understood that the above examples are not limitative, but illustrative in all aspects.

The invention claimed is:

1. A crystallization method of branched-chain amino acids comprising:
   (a) mixing a reaction solution containing branched-chain amino acid crystals with ammonia to obtain a solution in which the branched-chain amino acid crystals are dissolved;
   (b) crystallizing the obtained solution to obtain a concentrate containing branched-chain amino acid crystals;
   (c) obtaining a mixed gas including water vapor and ammonia, generated in the crystallization process; and
   (d) reusing ammonia derived from the obtained mixed gas as ammonia of the process (a); wherein the process (b) and process (c) are carried out simultaneously or sequentially,
   wherein in the process (a), a pH of the solution in which the branched-chain amino acid crystals are dissolved is 9 to 12.

2. The crystallization method of branched-chain amino acids of claim 1, wherein the branched-chain amino acid is at least one amino acid selected from the group consisting of L-leucine, L-isoleucine, and L-valine.

3. The crystallization method of branched-chain amino acids of claim 1, wherein the reaction solution containing the branched-chain amino acid crystals includes a solution or fermentation broth containing the branched-chain amino acid crystals.

4. The crystallization method of branched-chain amino acids of claim 3, wherein the fermentation broth containing the branched-chain amino acid crystals is obtained by culturing microorganisms producing branched-chain amino acids in a medium.

5. The crystallization method of branched-chain amino acids of claim 1, wherein the branched-chain amino acid concentration of the concentrate containing the branched-chain amino acid crystals of the process (b) is 1.3 times to 1.7 times the branched-chain amino acid concentration of the reaction solution containing the branched-chain amino acid crystals of the process (a).

6. The crystallization method of branched-chain amino acids of claim 1, wherein the process (c) is carried out until the pH of the branched-chain amino acid solution of the process (b) becomes 5.5 to 8.0.

7. The crystallization method of branched-chain amino acids of claim 1, wherein in the process (d), the ammonia is reused in a vapor state or in a liquid state to which the vapor is compressed or condensed.

8. The crystallization method of branched-chain amino acids of claim 1, further comprising: (a-1) microfiltering the solution in which the branched-chain amino acid crystals are dissolved to remove biomass in the solution, between the process (a) and the process (b).

9. The crystallization method of branched-chain amino acids of claim 1, further comprising: (a-2) adding activated carbon to the solution in which the branched-chain amino acid crystals are dissolved, to remove colored substances in the solution, between the process (a) and the process (b).

10. The crystallization method of branched-chain amino acids of claim 1, further comprising: (e) isolating the branched-chain amino acid crystals from the concentrate containing the branched-chain amino acid crystals of the process (b), after the process (b).

* * * * *